United States Patent
Motoyoshi et al.

(10) Patent No.: US 12,301,059 B2
(45) Date of Patent: May 13, 2025

(54) ROTATING ELECTRIC MACHINE

(71) Applicant: Mitsubishi Electric Corporation, Tokyo (JP)

(72) Inventors: Kenta Motoyoshi, Tokyo (JP); Hidenori Sasaki, Tokyo (JP); Kodai Okazaki, Tokyo (JP); Hiroko Ikeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 499 days.

(21) Appl. No.: 17/429,355

(22) PCT Filed: Mar. 28, 2019

(86) PCT No.: PCT/JP2019/013790
§ 371 (c)(1),
(2) Date: Aug. 9, 2021

(87) PCT Pub. No.: WO2020/194709
PCT Pub. Date: Oct. 1, 2020

(65) Prior Publication Data
US 2022/0149681 A1  May 12, 2022

(51) Int. Cl.
*H02K 1/276* (2022.01)

(52) U.S. Cl.
CPC ......... *H02K 1/276* (2013.01); *H02K 2201/03* (2013.01)

(58) Field of Classification Search
CPC .... H02K 1/276; H02K 2201/03; H02K 21/16; H02K 2213/03; H02K 1/2773
See application file for complete search history.

(56) References Cited

U.S. PATENT DOCUMENTS 10,199,892 B2 * 2/2019 Ekin ............... H02K 1/30
2003/0042815 A1  3/2003 Kinoshita
(Continued)

FOREIGN PATENT DOCUMENTS

JP  2003-153472 A   5/2003
JP  2010-94001 A    4/2010
(Continued)

OTHER PUBLICATIONS

International Search Report and Written Opinion mailed on Jul. 2, 2019, PCT Application PCT/JP2019/013790, Filed on Mar. 28, 2019, 10 pages including English Translation.

*Primary Examiner* — Christopher M Koehler
*Assistant Examiner* — Riley Owen Stout
(74) *Attorney, Agent, or Firm* — XSENSUS LLP

(57) ABSTRACT

Provided is a rotating electric machine, including: a stator; and a rotor, wherein the rotor includes: a rotor core having a plurality of holes formed so as to be arranged in a circumferential direction of the rotor; and at least one permanent magnet, wherein the number of magnetic poles of the rotor is "p", wherein the plurality of holes include a first hole into which the permanent magnet is inserted, and a second hole into which the permanent magnet is not inserted, the first hole including p/2 first holes, the second hole including p/2 second holes, wherein the first hole and the second hole are formed so as to be alternately arranged in the circumferential direction, and wherein the second hole includes a first opening portion that opens to the stator side in a radial direction of the rotor.

19 Claims, 13 Drawing Sheets

(56) References Cited

U.S. PATENT DOCUMENTS

| | | | |
|---|---|---|---|
| 2011/0121668 A1* | 5/2011 | Condamin | H02K 1/2773 310/156.43 |
| 2013/0278105 A1* | 10/2013 | Han | H02K 1/2773 310/156.38 |
| 2014/0102674 A1* | 4/2014 | Manz | H02K 1/2773 29/598 |
| 2014/0191628 A1 | 7/2014 | Nakano et al. | |
| 2020/0083767 A1* | 3/2020 | Chu | H02K 1/2773 |
| 2021/0242736 A1* | 8/2021 | Wang | H02K 1/276 |

FOREIGN PATENT DOCUMENTS

| | | |
|---|---|---|
| JP | 2010-200480 A | 9/2010 |
| WO | 2013/094075 A1 | 6/2013 |

\* cited by examiner

ROTATING ELECTRIC MACHINE

CROSS-REFERENCE TO RELATED APPLICATION

The present application is based on PCT filing PCT/JP2019/013790, filed Mar. 28, 2019, the entire contents of which are incorporated herein by reference.

TECHNICAL FIELD

The present invention relates to a rotating electric machine including an interior magnet rotor.

BACKGROUND ART

In Patent Literature 1, an interior magnet motor is described. In an annular surface of a rotor of the interior magnet motor, rectangular slits which are half as many as the number of motor poles P and rectangular permanent magnets which are as many as the number of slits are alternately arranged at predetermined intervals in a circumferential direction. Segment regions at P portions are formed between the slits and the permanent magnets. The segment regions are magnetized alternately to N poles and S poles along the circumferential direction.

CITATION LIST

Patent Literature

[PTL 1] JP 2010-200480 A

SUMMARY OF INVENTION

Technical Problem

In the rotor of the interior magnet motor described above, two segment regions adjacent to each other across the slit are connected to each other through a connecting portion located on an inner peripheral side with respect to the slit and a connecting portion located on an outer peripheral side with respect to the slit. Thus, in the rotor, a closed magnetic circuit in which a magnetic flux flows through those connecting portions in the circumferential direction is formed. Thus, there is a problem in that circumferential leakage magnetic fluxes that are not interlinked with a stator increase, thereby degrading torque output in the motor.

The present invention has been made in view of the above-mentioned problem, and has an object to provide a rotating electric machine capable of improving torque output.

Solution to Problem

According to one embodiment of the present invention, there is provided a rotating electric machine, including: a stator; and a rotor provided rotatably with respect to the stator, wherein the rotor includes: a rotor core having a plurality of holes formed so as to be arranged in a circumferential direction of the rotor; and at least one permanent magnet, wherein the number of magnetic poles of the rotor is "p" which is an even number of two or more, wherein the plurality of holes include a first hole into which the permanent magnet is inserted, and a second hole into which the permanent magnet is not inserted, the first hole comprising p/2 first holes, the second hole comprising p/2 second holes, wherein the first hole and the second hole are formed so as to be alternately arranged in the circumferential direction, wherein the permanent magnet is magnetized such that magnetic-pole surfaces facing each other in the circumferential direction across the second hole have different poles, and wherein the second hole includes a first opening portion that opens to the stator side in a radial direction of the rotor.

Advantageous Effects of Invention

According to the present invention, the torque output in the rotating electric machine can be improved.

DESCRIPTION OF EMBODIMENTS

First Embodiment

Figure 1:
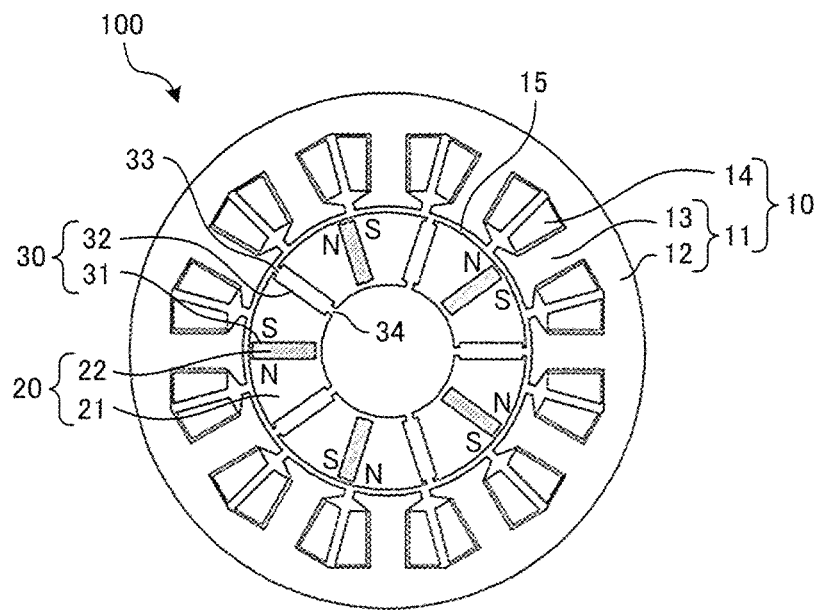
FIG. 1 is a sectional view for illustrating a configuration of a rotating electric machine according to a first embodiment of the present invention, which is taken perpendicularly to an axial direction.

A rotating electric machine according to a first embodiment of the present invention is described. FIG. 1 is a sectional view for illustrating a configuration of a rotating electric machine 100 according to this embodiment, which is taken perpendicularly to an axial direction. Here, a direction along an axial center of a rotor 20 is defined as an axial direction, a direction along a radius of the rotor 20 in a cross section perpendicular to the axial direction is defined as a radial direction, and a direction along a rotating direction of the rotor 20 in the same cross section is defined as a circumferential direction.

Figure 2:
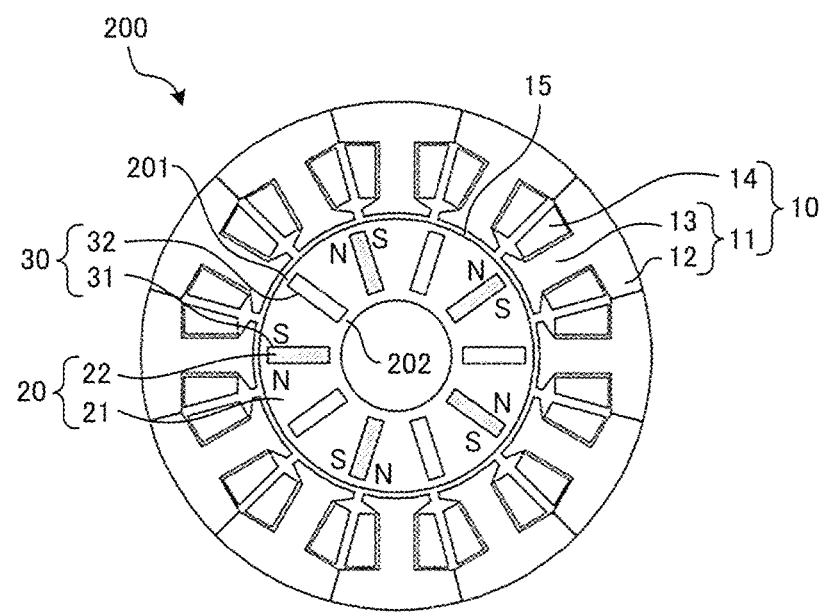
FIG. 2 is a sectional view for illustrating a configuration of a rotating electric machine according to a comparative example of the first embodiment of the present invention, which is taken perpendicularly to the axial direction.

As illustrated in FIG. 1, the rotating electric machine 100 includes a stator 10, and a rotor 20 provided rotatably with respect to the stator 10. The stator 10 is provided so as to surround an outer periphery of the rotor 20 through a gap 15 serving as a magnetic gap. The stator 10 includes a stator core 11. The stator core 11 includes a core back 12 formed in an annular shape, and a plurality of teeth 13 protruding from the core back 12 toward an inner peripheral side. Further, the stator 10 includes a plurality of windings 14 wound around the plurality of teeth 13, respectively, by a concentrated winding method. In the configuration illustrated in FIG. 1, twelve teeth 13 and twelve windings 14 are provided. As illustrated in FIG. 2 referred to below, the core back 12 may be formed of a plurality of core blocks each having an arc shape.

The rotor 20 includes a rotor core 21 and permanent magnets 22 provided inside the rotor core 21. The rotor 20 is an interior magnet rotor of vertical interior type in which the permanent magnets 22 are radially arranged inside the rotor core 21. The interior magnet rotor of vertical interior type may be referred to as a spoke rotor. Further, the rotor 20 is a consequent-pole rotor having p/2 permanent magnets 22 when the number of magnetic poles is "p". Here, "p" is an even number of two or more. In the configuration illustrated in FIG. 1, the number of magnetic poles "p" of the rotor 20 is ten, and hence the number of permanent magnets 22 is five.

The rotor core 21 has a configuration in which a plurality of core plates are laminated in the axial direction. The rotor core 21 has a plurality of holes 30 penetrating in the axial direction. The plurality of holes 30 are arranged in the circumferential direction of the rotor 20. In the cross section perpendicular to the axial direction, each of the plurality of holes 30 has a rectangular shape. In the same cross section, the plurality of holes 30 are radially arranged such that each longitudinal direction thereof extends along the radial direction. The number of holes 30 is "p", which is equal to the number of magnetic poles of the rotor 20.

The permanent magnets 22 are inserted into some of the plurality of holes 30. That is, the plurality of holes 30 include a plurality of first holes 31 into which the permanent magnets 22 are inserted, and a plurality of second holes 32 into which the permanent magnets 22 are not inserted. The number of first holes 31 and the number of second holes 32 are both p/2. The plurality of first holes 31 and the plurality of second holes 32 are alternately arranged in the circumferential direction of the rotor 20. The inside of each of the second holes 32 may be a space. Alternatively, non-magnetic members made of a non-magnetic material such as resin or non-magnetic metal may be inserted into the second holes 32. Further, the rotor core 21 may be held by the non-magnetic members inserted into the second holes 32.

The plurality of permanent magnets 22 are magnetized such that two magnetic-pole surfaces adjacent to each other in the circumferential direction across the second hole 32 have different poles. For example, each of the plurality of permanent magnets 22 is magnetized such that the magnetic-pole surface facing a counterclockwise direction in FIG. 1 becomes an N pole, and the magnetic-pole surface facing a clockwise direction in FIG. 1 becomes an S pole.

The second holes 32 each have a first opening portion 33 that opens toward the stator 10 side in the radial direction. In this embodiment, the first opening portion 33 opens toward a radially outer side. The first opening portion 33 serves as a magnetic gap in the circumferential direction at an outer peripheral portion of the rotor core 21. The first opening portion 33 may be a space. Alternatively, a non-magnetic member may be filled in the first opening portion 33.

Further, the second holes 32 each have a second opening portion 34 that opens toward a side opposite to the stator 10 in the radial direction. In this embodiment, the second opening portion 34 opens toward a radially inner side. The second opening portion 34 serves as a magnetic gap in the circumferential direction at an inner peripheral portion of the rotor core 21. The second opening portion 34 may be a space. Alternatively, a non-magnetic member may be filled in the second opening portion 34.

FIG. 2 is a sectional view for illustrating a configuration of a rotating electric machine 200 according to a comparative example of this embodiment, which is taken perpendicularly to the axial direction. As illustrated in FIG. 2, the rotating electric machine 200 in this comparative example is different from the rotating electric machine 100 illustrated in FIG. 1 in that the first opening portions 33 and the second opening portions 34 are not formed. That is, in the rotating electric machine 200 in this comparative example, the radially outer sides of the second holes 32 are closed by a connecting portion 201, and radially inner sides of the second holes 32 are closed by a connecting portion 202. The core back 12 in this comparative example is formed of a plurality of core blocks each having an arc shape, but the core back 12 may be formed in an integral annular shape as illustrated in FIG. 1.

Figure 3:
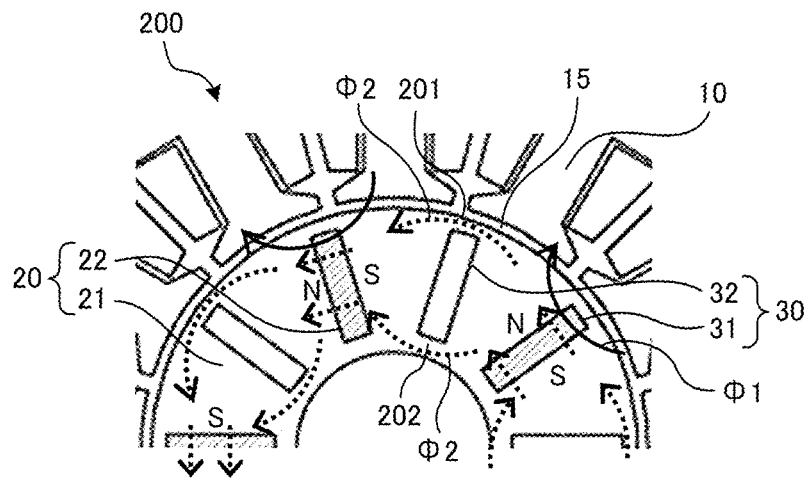
FIG. 3 is a view for illustrating a part of FIG. 2 in an enlarged manner.

FIG. 3 is a view for illustrating a part of FIG. 2 in an enlarged manner. In FIG. 3, effective magnetic fluxes $\Phi 1$ that are interlinked with the stator 10 and contribute to torque are indicated by the solid line arrows, and circumferential leakage magnetic fluxes $\Phi 2$ each passing through a closed magnetic circuit in the circumferential direction, which is closed in the rotor core 21, are indicated by the broken line arrows. As illustrated in FIG. 3, the radially outer sides and the radially inner sides of the second holes 32 are closed by the connecting portion 201 and the connecting portion 202, respectively. The magnetic resistance of the connecting portion 201 and the connecting portion 202 is extremely lower than the magnetic resistance of the gap 15. Thus, the closed magnetic circuit in the circumferential direction, which is closed in the rotor core 21, is actively formed, and a magnetic path that causes a magnetic flux to be interlinked with the stator 10 is less liable to be formed. With this, the circumferential leakage magnetic fluxes $\Phi 2$ passing through the connecting portion 201 and the connecting portion 202 relatively increase with respect to the amount of use of the permanent magnets 22, and hence the effective magnetic fluxes $\Phi 1$ that pass through the gap 15 and are interlinked with the stator 10 reduce. Thus, it has been difficult to improve torque output in the rotating electric machine 200 in a configuration as this comparative example.

Figure 4:
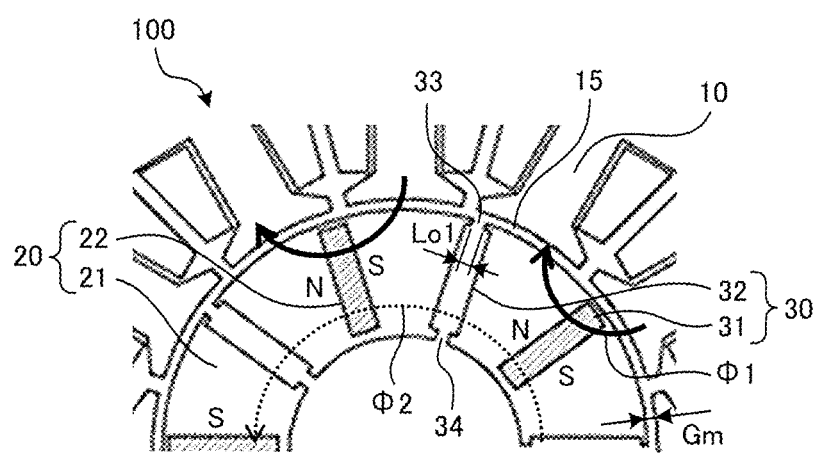
FIG. 4 is a view for illustrating a part of FIG. 1 in an enlarged manner.

In contrast, in this embodiment, the first opening portion 33 and the second opening portion 34 are formed on the radially outer side and the radially inner side of the second hole 32, respectively. FIG. 4 is a view for illustrating a part of FIG. 1 in an enlarged manner. In FIG. 4, similarly to FIG. 3, effective magnetic fluxes $\Phi 1$ are indicated by the solid line arrows, and circumferential leakage magnetic fluxes $\Phi 2$ are indicated by the broken line arrows. As illustrated in FIG. 4, a closed magnetic circuit in the circumferential direction, which is closed in the rotor core 21, always passes through the second hole 32, the first opening portion 33, or the second opening portion 34, and hence the magnetic resistance of the closed magnetic circuit increases. With this, in particular, the circumferential leakage magnetic fluxes $\Phi 2$ can be reduced near the outer periphery of the rotor core 21, and the effective magnetic fluxes $\Phi 1$ interlinked with the stator 10 can be increased. Thus, in the rotating electric machine 100 in this embodiment, torque output can be improved more than that of the rotating electric machine 200 in the comparative example.

Figure 5:
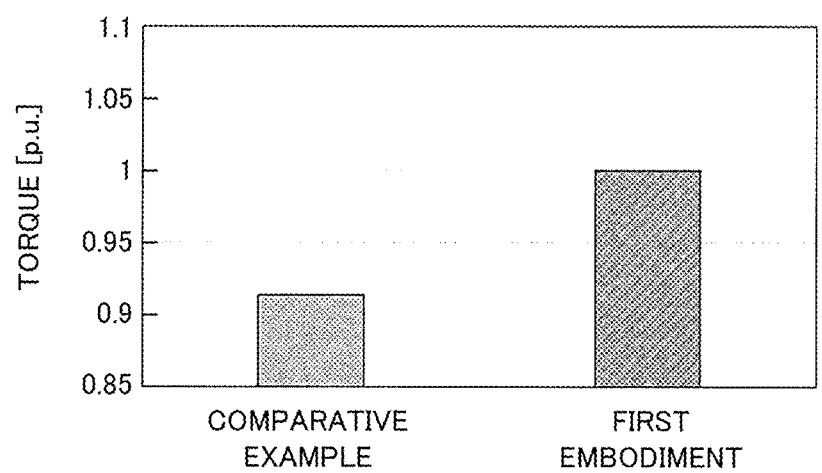
FIG. 5 is a graph for showing torque obtained in the rotating electric machine in the first embodiment of the present invention and torque obtained in the rotating electric machine in the comparative example.

FIG. 5 is a graph for showing torque obtained in the rotating electric machine 100 in this embodiment and torque obtained in the rotating electric machine 200 in the comparative example. The vertical axis in the graph represents torque [p.u.] normalized with the torque in the rotating electric machine 100 in this embodiment as 1. As shown in FIG. 5, when the torque obtained in the rotating electric machine 100 in this embodiment is 1, the torque obtained in the rotating electric machine 200 in the comparative example is about 0.91. Thus, it is understood that, in the rotating electric machine 100 in this embodiment, torque higher than that in the rotating electric machine 200 in the comparative example can be obtained.

Next, an opening width of the first opening portion 33 is described. Here, the first opening portion 33 is an opening portion of the second hole 32 which opens toward the stator 10 side in the radial direction. In this embodiment, the stator 10 is provided on an outer peripheral side of the rotor 20, and hence the first opening portion 33 opens toward the radially outer side. As illustrated in FIG. 4, the opening width of the first opening portion 33 in a tangential direction along the circumferential direction of the rotor 20 is Lo1. Further, an interval between the rotor 20 and the stator 10 in the radial direction is Gm. The interval Gm is a radial width of the gap 15 serving as the magnetic gap between the rotor 20 and the stator 10.

Figure 6:
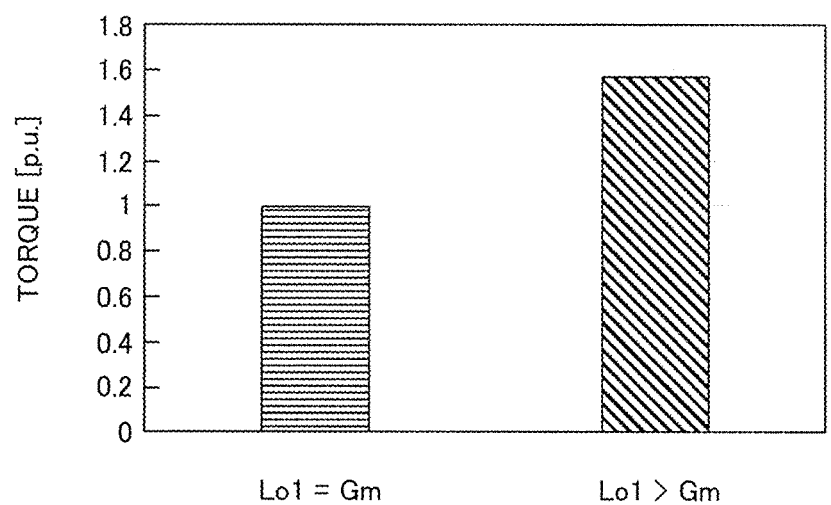
FIG. 6 is a graph for showing a relationship between a magnitude relation between an opening width Lo1 and an interval Gm and torque in the rotating electric machine according to the first embodiment of the present invention.

FIG. 6 is a graph for showing a relationship between a magnitude relation between the opening width Lo1 and the interval Gm and torque in the rotating electric machine 100 according to this embodiment. The vertical axis in the graph represents torque [p.u.] normalized with torque in the rotating electric machine 100 when the opening width Lo1 and the interval Gm are equal to each other as 1. As shown in FIG. 6, assuming that the torque when the opening width Lo1 and the interval Gm are equal to each other (Lo1=Gm) is 1, torque when the opening width Lo1 is larger than the interval Gm (Lo1>Gm) is about 1.58. Thus, it is understood that higher torque can be obtained when the opening width Lo1 is larger than the interval Gm than that when the opening width Lo1 and the interval Gm are equal to each other. This is because the magnetic flux flowing out from the permanent magnet 22 passes through a path having a smaller magnetic resistance. When the opening width Lo1 is larger than the interval Gm, the magnetic resistance of a path passing through the first opening portion 33 tends to increase as compared to the magnetic resistance of a path passing through the gap 15. Thus, a larger number of magnetic fluxes flowing out from the permanent magnets 22 become the effective magnetic fluxes $\Phi 1$ interlinked with the stator 10.

Figure 7:
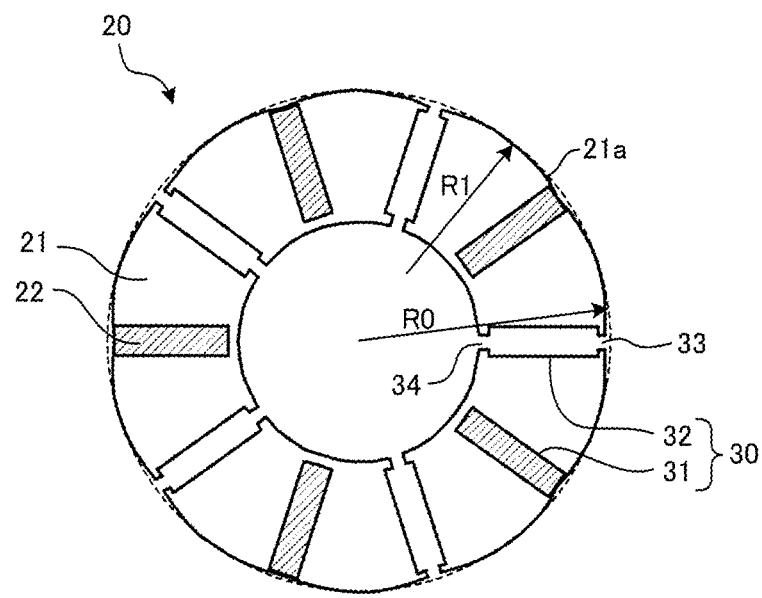
FIG. 7 is a sectional view for illustrating a configuration of a rotor of a rotating electric machine according to a modification example 1-1 of the first embodiment of the present invention, which is taken perpendicularly to the axial direction.

FIG. 7 is a sectional view for illustrating a configuration of a rotor 20 of a rotating electric machine 100 according to a modification example 1-1 of this embodiment, which is taken perpendicularly to the axial direction. Here, although the stator 10 is not shown in FIG. 7 and the subsequent drawings, the stator 10 is provided on an outer peripheral side of the rotor 20. The rotor core 21 illustrated in FIG. 1 and FIG. 4 has a true circular shape as viewed perpendicularly to the axial direction. In contrast, as illustrated in FIG. 7, a rotor core 21 of the rotor 20 according to this modification example has a non-true circular shape as viewed perpendicularly to the axial direction. In FIG. 7, a circumscribed circle circumscribing the rotor core 21 is illustrated with the broken line. A radius of the circumscribed circle is R0. An outer peripheral surface of the rotor core 21 is formed in arc shapes in respective sections each sandwiched between two holes 30 adjacent to each other in the circumferential direction. Curvature centers of outer peripheral surfaces 21a of the respective sections are different from each other, and are also different from a center of the circumscribed circle. A curvature radius R1 of the outer peripheral surface 21a of each section is smaller than the radius R0 of the circumscribed circle (R1<R0). The rotor core 21 is formed in the shape as illustrated in FIG. 7 rather than a true circular shape, thereby being capable of reducing cogging torque and torque ripple.

Here, when the rotor 20 having a non-true circular shape as illustrated in FIG. 7 is used, the interval Gm between the rotor 20 and the stator 10 differs at each position in the circumferential direction of the rotor 20. In such a case, it is preferred that the opening width Lo1 of the first opening portion 33 be larger than a maximum value Gmmax of the interval Gm (Lo1>Gmmax).

Figure 8:
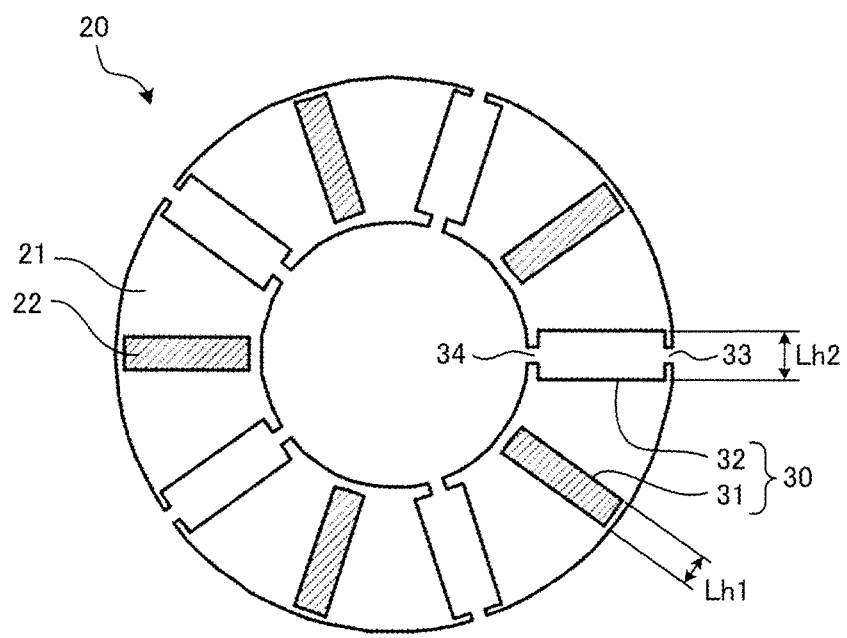
FIG. 8 is a sectional view for illustrating a configuration of a rotor of a rotating electric machine according to a modification example 1-2 of the first embodiment of the present invention, which is taken perpendicularly to the axial direction.

FIG. 8 is a sectional view for illustrating a configuration of a rotor 20 of a rotating electric machine 100 according to a modification example 1-2 of this embodiment, which is taken perpendicularly to the axial direction. In the rotor 20 illustrated in FIG. 1 and FIG. 4, a width of the first hole 31 in the tangential direction along the circumferential direction and a width of the second hole 32 in the tangential direction along the circumferential direction are equal to each other. In contrast, as illustrated in FIG. 8, in the rotor 20 in this modification example, a width Lh1 of the first hole 31 in the tangential direction along the circumferential direction is smaller than a width Lh2 of the second hole 32 in the tangential direction along the circumferential direction (Lh1<Lh2). Also in this modification example, the same effects as those of the rotor 20 illustrated in FIG. 1 and FIG. 4 can be obtained.

Figure 9:
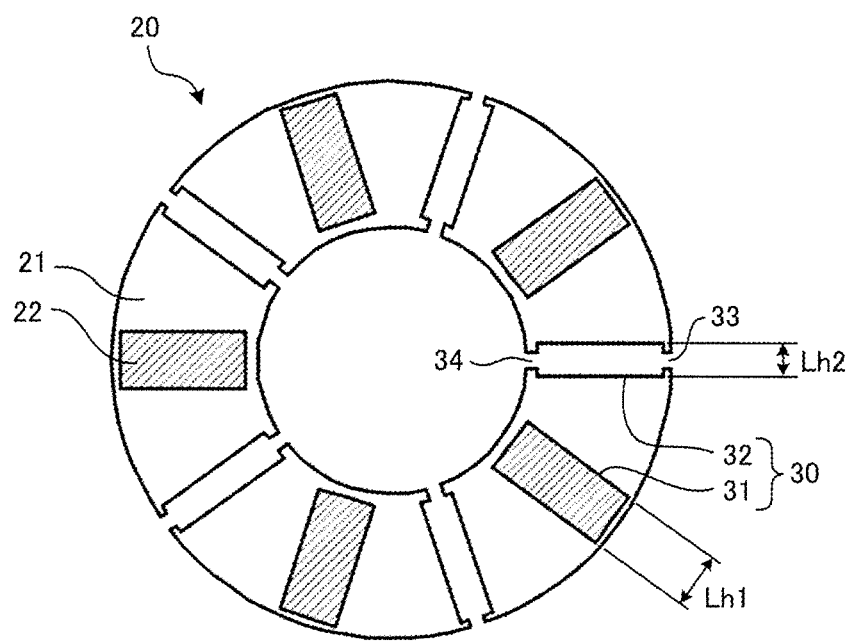
FIG. 9 is a sectional view for illustrating a configuration of a rotor of a rotating electric machine according to a modification example 1-3 of the first embodiment of the present invention, which is taken perpendicularly to the axial direction.

FIG. 9 is a sectional view for illustrating a configuration of a rotor 20 of a rotating electric machine 100 according to a modification example 1-3 of this embodiment, which is taken perpendicularly to the axial direction. As illustrated in FIG. 9, in the rotor 20 in this modification example, the width Lh1 of the first hole 31 in the tangential direction along the circumferential direction is larger than the width Lh2 of the second hole 32 in the tangential direction along the circumferential direction (Lh1>Lh2). Also in this modification example, the same effects as those of the rotor 20 illustrated in FIG. 1 and FIG. 4 can be obtained.

Figure 10:
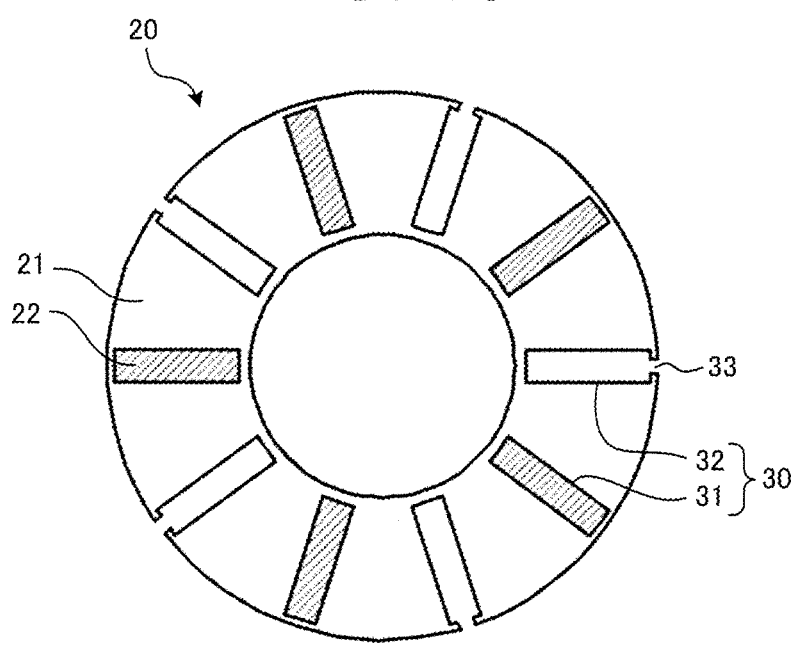
FIG. 10 is a sectional view for illustrating a configuration of a rotor of a rotating electric machine according to a modification example 1-4 of the first embodiment of the present invention, which is taken perpendicularly to the axial direction.

FIG. 10 is a sectional view for illustrating a configuration of a rotor 20 of a rotating electric machine 100 according to a modification example 1-4 of this embodiment, which is taken perpendicularly to the axial direction. The second holes 32 of the rotor 20 illustrated in FIG. 1 and FIG. 4 each have the first opening portion 33 that opens toward the stator 10 side in the radial direction, and the second opening portion 34 that opens toward the side opposite to the stator 10 in the radial direction. In contrast, as illustrated in FIG. 10, the second holes 32 of the rotor 20 in this modification example each have only the first opening portion 33, and each have no second opening portion 34. Also in this modification example, as compared to the configuration in the comparative example illustrated in FIG. 2 and FIG. 3, the circumferential leakage magnetic fluxes $\Phi 2$ can be reduced particularly at a portion of the rotor core 21 on the stator 10 side in the radial direction, that is, a portion on the radially outer side. Thus, also in this modification example, the effective magnetic fluxes $\Phi 1$ can be increased, thereby being capable of improving torque output in the rotating electric machine 100.

As described above, the rotating electric machine 100 according to this embodiment includes the stator 10, and the rotor 20 provided rotatably with respect to the stator 10. The rotor 20 includes the rotor core 21 having the plurality of holes 30 formed so as to be arranged in the circumferential direction of the rotor 20, and at least one permanent magnet 22. The number of magnetic poles of the rotor 20 is "p" which is an even number of two or more. The plurality of holes 30 include the first hole 31 into which the permanent magnet 22 is inserted, and the second hole 32 into which the permanent magnet 22 is not inserted, the first hole 31 including p/2 first holes 31, the second hole 32 including p/2 second holes 32. The first hole 31 and the second hole 32 are formed so as to be alternately arranged in the circumferential direction. The permanent magnet 22 is magnetized such that the magnetic-pole surfaces facing each other in the circumferential direction across the second hole 32 have different poles. The second hole 32 includes the first opening portion 33 that opens toward the stator 10 side in the radial direction of the rotor 20.

According to this configuration, at least at a portion of the rotor core 21 on the stator 10 side in the radial direction, the magnetic resistance in the closed magnetic circuit in the circumferential direction can be increased. With this, at the portion of the rotor core 21 on the stator 10 side in the radial direction, the circumferential leakage magnetic fluxes $\Phi 2$ can be reduced, and the effective magnetic fluxes $\Phi 1$ interlinked with the stator 10 can be increased. Thus, the torque output in the rotating electric machine 100 can be improved. Further, according to the above-mentioned configuration, the rotor 20 having "p" poles is configured with use of p/2 permanent magnets 22, thereby being capable of reducing the amount of use of the permanent magnets 22.

Further, in the rotating electric machine 100 according to this embodiment, the second hole 32 includes the second opening portion 34 that opens to the side opposite to the stator 10 in the radial direction. According to this configuration, at a portion of the rotor core 21 on the side opposite to the stator 10 in the radial direction, the magnetic resistance in the closed magnetic circuit in the circumferential direction can be increased. With this, also at the portion of the rotor core 21 on the side opposite to the stator 10 in the radial direction, the circumferential leakage magnetic fluxes $\Phi 2$ can be reduced, thereby being capable of further increasing the effective magnetic fluxes $\Phi 1$ interlinked with the stator 10.

Further, in the rotating electric machine 100 according to this embodiment, when the opening width of the first opening portion 33 is Lo1, and the maximum value of the interval between the stator 10 and the rotor 20 in the radial direction is Gmmax, the relationship of Lo1>Gmmax is satisfied. According to this configuration, the magnetic resistance of the path passing through the first opening portion 33 tends to increase as compared to the magnetic resistance of the path passing through the gap 15, thereby being capable of further increasing the effective magnetic fluxes $\Phi 1$ interlinked with the stator 10.

Second Embodiment

Figure 11:
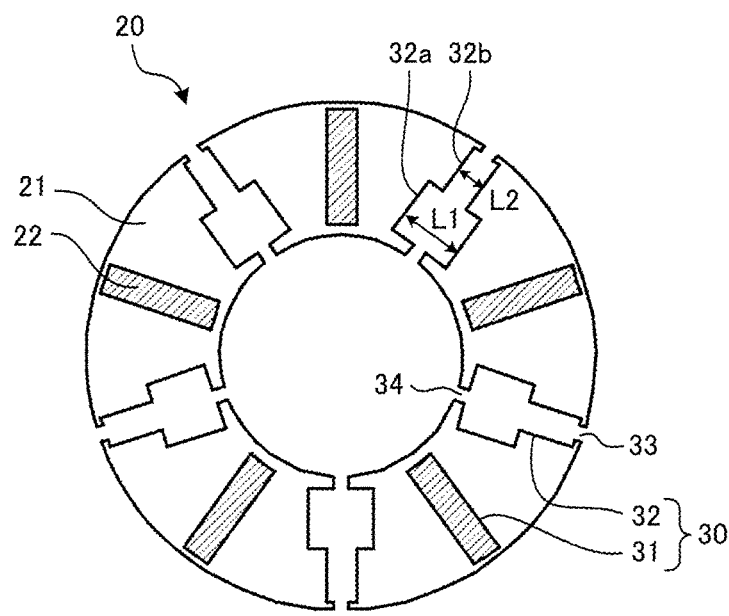
FIG. 11 is a sectional view for illustrating a configuration of a rotor of a rotating electric machine according to a second embodiment of the present invention, which is taken perpendicularly to the axial direction.

A rotating electric machine according to a second embodiment of the present invention is described. FIG. 11 is a sectional view for illustrating a configuration of a rotor 20 of a rotating electric machine 100 according to this embodiment, which is taken perpendicularly to the axial direction. Components having the same functions and effects as those of the first embodiment are denoted by the same reference symbols, and description thereof is omitted.

As illustrated in FIG. 11, the second holes 32 each include a first portion 32a, and a second portion 32b located on the stator 10 side in the radial direction, that is, on the outer peripheral side in FIG. 11 with respect to the first portion 32a. When a width of the first portion 32a in the tangential direction along the circumferential direction is L1, and a width of the second portion 32b in the same tangential direction is L2, a relationship of L1>L2 is satisfied.

As described with reference to FIG. 1 and FIG. 4, in the above-mentioned first embodiment, the torque output in the rotating electric machine 100 can be improved. However, it is difficult to reduce the circumferential leakage magnetic fluxes Φ2 to zero, and hence the circumferential leakage magnetic flux Φ2 exists even in the first embodiment as indicated by the broken line arrow in FIG. 4. In order to further improve the torque output in the rotating electric machine 100, it is required to further reduce the circumferential leakage magnetic fluxes Φ2. In the rotor 20 in the first embodiment illustrated in FIG. 1 and FIG. 4, it is considered that there are a larger number of circumferential leakage magnetic fluxes Φ2 on the inner peripheral side far from the stator 10 and a smaller number of circumferential leakage magnetic fluxes Φ2 on the outer peripheral side close to the stator 10. In view of this, the inventors of the present application consider that, when the width L1 of the first portion 32a of the second hole 32 is set larger than the width L2 of the second portion 32b located on the outer peripheral side with respect to the first portion 32a, the circumferential leakage magnetic fluxes Φ2 on the inner peripheral side can be reduced so that the effective magnetic fluxes Φ1 can be increased.

Figure 12:
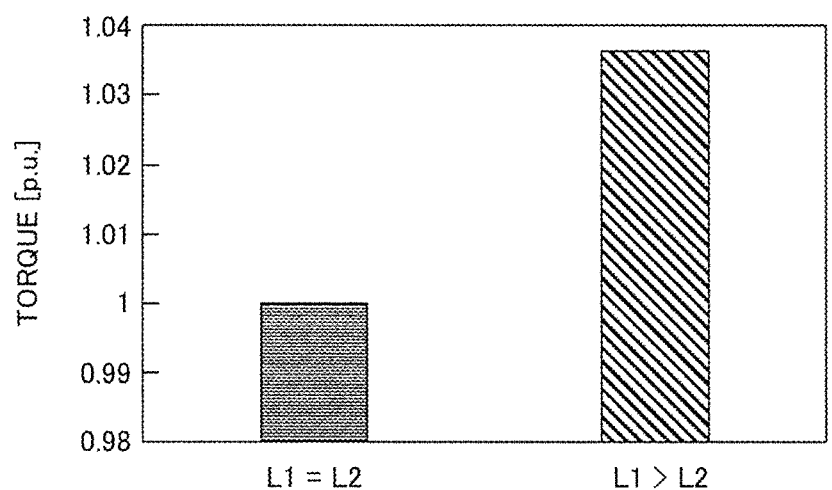
FIG. 12 is a graph for showing a relationship between a magnitude relation between a width L1 and a width L2 and torque in the rotating electric machine according to the second embodiment of the present invention.

FIG. 12 is a graph for showing a relationship between a magnitude relation between the width L1 and the width L2 and torque in the rotating electric machine 100 according to this embodiment. The vertical axis in the graph represents torque [p.u.] normalized with torque in a case of L1=L2 as 1. As shown in FIG. 12, when the torque obtained in the case of L1=L2 is 1, torque obtained in a case of L1>L2 is about 1.036. Thus, it is understood that, when the width L1 of the first portion 32a is set larger than the width L2 of the second portion 32b, the torque output in the rotating electric machine 100 can be further increased.

Figure 13:
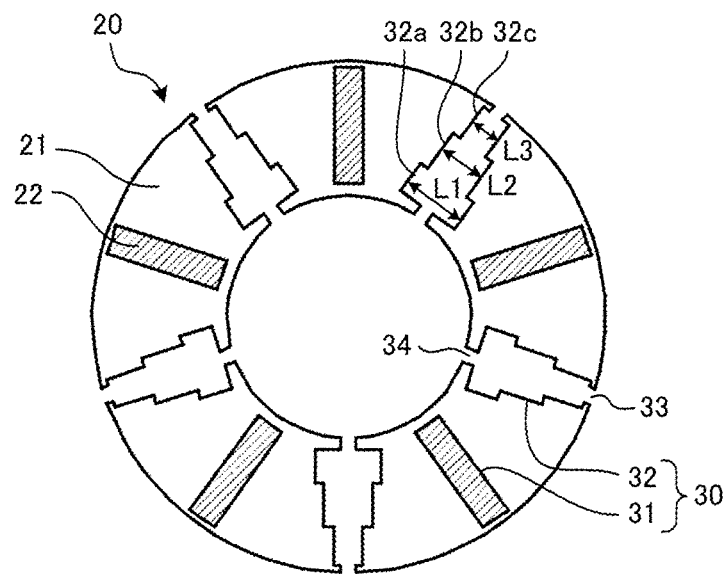
FIG. 13 is a sectional view for illustrating a configuration of a rotor of a rotating electric machine according to a FIG. 14 is a sectional view for illustrating a configuration of a rotor of a rotating electric machine according to a modification example 2-2 of the second embodiment of the present invention, which is taken perpendicularly to the axial direction.

In the configuration illustrated in FIG. 11, the width of the second hole 32 is changed in two steps, but other configurations are also conceivable. FIG. 13 is a sectional view for illustrating a configuration of a rotor 20 of a rotating electric machine 100 according to a modification example 2-1 of this embodiment, which is taken perpendicularly to the axial direction. In the configuration illustrated in FIG. 13, the second holes 32 each include the first portion 32a, the second portion 32b located on the outer side in the radial direction with respect to the first portion 32a, and a third portion 32c located on the outer side in the radial direction with respect to the second portion 32b. When the width of the first portion 32a in the tangential direction along the circumferential direction is L1, the width of the second portion 32b in the same tangential direction is L2, and a width of the third portion 32c in the same tangential direction is L3, a relationship of L1>L2>L3 is satisfied. As described above, the width of the second hole 32 may be changed in three or more steps.

Figure 14:
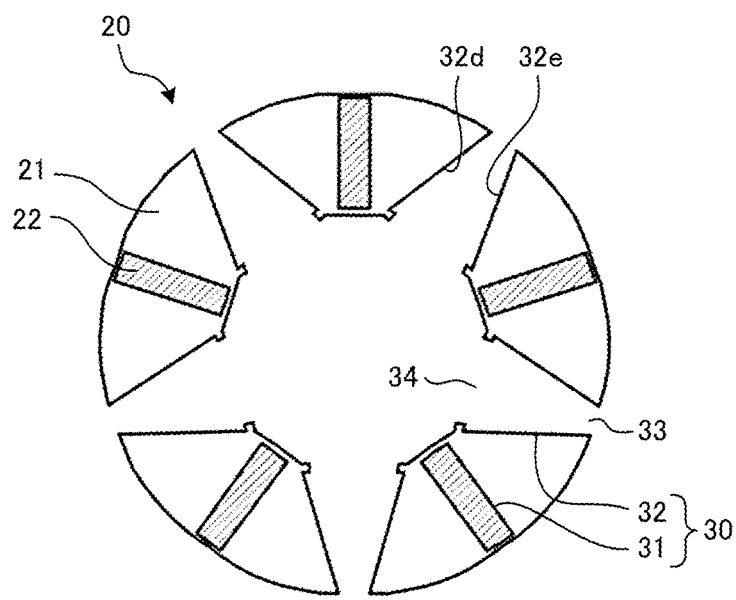

FIG. 14 is a sectional view for illustrating a configuration of a rotor 20 of a rotating electric machine 100 according to a modification example 2-2 of this embodiment, which is taken perpendicularly to the axial direction. In the configuration illustrated in FIG. 14, the width of the second hole 32 monotonically increases as the distance from the stator 10 increases in the radial direction. The second hole 32 is sandwiched in the circumferential direction by a pair of edge portions 32d and 32e formed in the rotor core 21. The pair of edge portions 32d and 32e are each formed in a linear shape.

Figure 15:
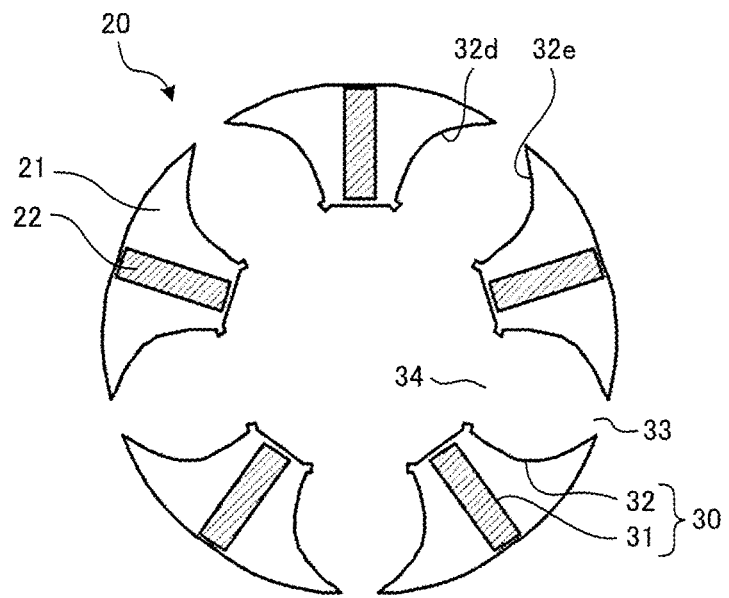
FIG. 15 is a sectional view for illustrating a configuration of a rotor of a rotating electric machine according to a modification example 2-3 of the second embodiment of the present invention, which is taken perpendicularly to the axial direction.

FIG. 15 is a sectional view for illustrating a configuration of a rotor 20 of a rotating electric machine 100 according to a modification example 2-3 of this embodiment, which is taken perpendicularly to the axial direction. In the configuration illustrated in FIG. 15, the width of the second hole 32 does not necessarily monotonically increase as the distance from the stator 10 increases in the radial direction. However, the width of the second hole 32 roughly increases as the distance from the stator 10 increases in the radial direction. The pair of edge portions 32d and 32e of the rotor core 21 are each formed in a concave curve shape.

Figure 16:
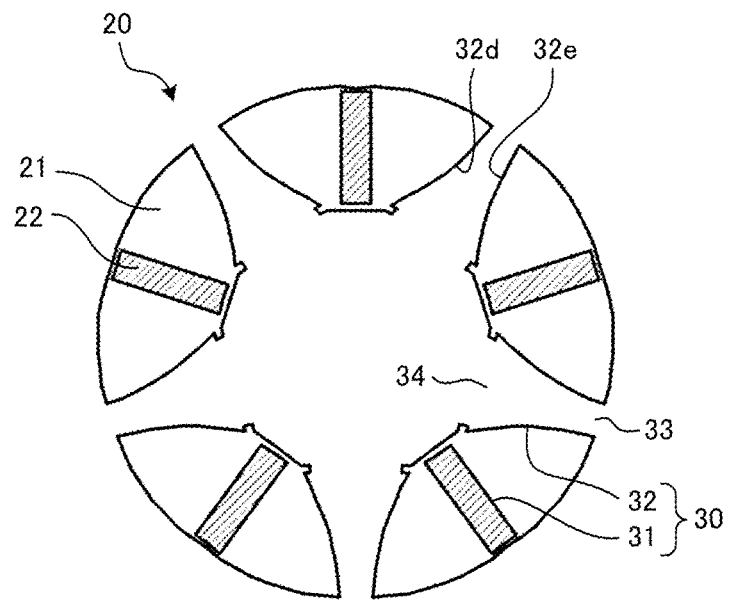
FIG. 16 is a sectional view for illustrating a configuration of a rotor of a rotating electric machine according to a modification example 2-4 of the second embodiment of the present invention, which is taken perpendicularly to the axial direction.

FIG. 16 is a sectional view for illustrating a configuration of a rotor 20 of a rotating electric machine 100 according to a modification example 2-4 of this embodiment, which is taken perpendicularly to the axial direction. In the configuration illustrated in FIG. 16, the width of the second hole 32 monotonically increases as the distance from the stator 10 increases in the radial direction. The pair of edge portions 32d and 32e of the rotor core 21 are each formed in a convex curve shape.

Also in the configurations illustrated in FIG. 13 to FIG. 16, similarly to the configuration illustrated in FIG. 11, the torque output in the rotating electric machine 100 can be improved.

As described above, in the rotating electric machine 100 according to this embodiment, the second hole 32 includes the first portion 32a, and the second portion 32b located on the stator 10 side in the radial direction with respect to the first portion 32a. When the width of the first portion 32a in the tangential direction along the circumferential direction is L1, and the width of the second portion 32b in the tangential direction is L2, the relationship of L1>L2 is satisfied. According to this configuration, the circumferential leakage magnetic fluxes Φ2 can be reduced at a portion far from the stator 10, thereby being capable of further improving the torque output in the rotating electric machine 100.

Further, in the rotating electric machine 100 according to this embodiment, the second hole 32 is formed so as to have a width in the tangential direction that increases as the distance from the stator 10 increases in the radial direction. According to this configuration, the circumferential leakage magnetic fluxes Φ2 at the portion far from the stator 10 can be reduced, thereby being capable of further improving the torque output in the rotating electric machine 100.

Third Embodiment

Figure 17:
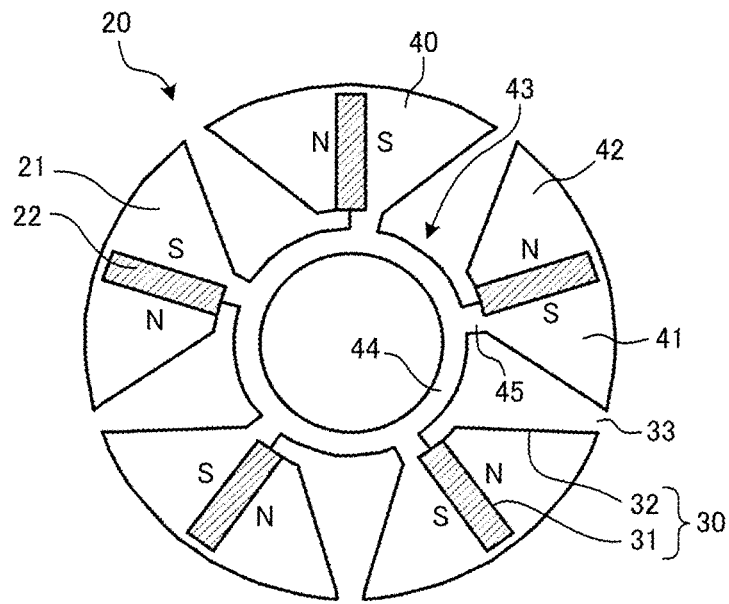
FIG. 17 is a sectional view for illustrating a configuration of a rotor of a rotating electric machine according to a third embodiment of the present invention, which is taken perpendicularly to the axial direction.

A rotating electric machine according to a third embodiment of the present invention is described. FIG. 17 is a sectional view for illustrating a configuration of a rotor 20 of a rotating electric machine 100 according to this embodiment, which is taken perpendicularly to the axial direction.

Components having the same functions and effects as those of the first or second embodiment are denoted by the same reference symbols, and description thereof is omitted.

As illustrated in FIG. 17, a rotor core 21 includes a plurality of core portions 40 each sandwiched by two second holes 32 adjacent to each other in the circumferential direction. The permanent magnet 22 is provided for each of the plurality of core portions 40. Each of the permanent magnets 22 is magnetized such that the magnetic-pole surface facing a counterclockwise direction in FIG. 17 becomes an N pole, and the magnetic-pole surface facing a clockwise direction in FIG. 17 becomes an S pole.

Each of the plurality of core portions 40 includes a first core portion 41 located on the S pole side of the permanent magnet 22, and a second core portion 42 located on the N pole side of the permanent magnet 22. In the rotor core 21 illustrated in FIG. 17, five core portions 40 are provided, and hence five first core portions 41 and five second core portions 42 are provided.

The rotor core 21 includes a coupling portion 43 (which may be hereinafter referred to as "first coupling portion 43") that couples the plurality of first core portions 41 to each other. The coupling portion 43 is arranged on the radially inner side with respect to the plurality of core portions 40. The coupling portion 43 includes an annular portion 44 and a plurality of radial portions 45. The annular portion 44 is formed in an annular shape. The plurality of radial portions 45 radially extend from the annular portion 44 toward the plurality of first core portions 41, and connect the annular portion 44 and the plurality of first core portions 41 to each other. With this, the plurality of first core portions 41 are magnetically connected to each other through the coupling portion 43.

Meanwhile, each of the plurality of second core portions 42 is not directly connected to the radial portion 45 of the coupling portion 43. Each of the plurality of second core portions 42 is connected to the coupling portion 43 through only the first core portion 41 adjacent to the corresponding second core portion 42 across the permanent magnet 22.

According to this embodiment, the plurality of first core portions 41 having the same pole are coupled to each other through the coupling portion 43, thereby being capable of suppressing occurrence of the circumferential leakage magnetic flux Φ2. Further, the plurality of core portions 40 are integrated through the coupling portion 43. As a result, the mechanical strength of the rotor 20 can be improved, and the productivity of the rotor 20 can be improved.

Here, in this embodiment, the width of the second hole 32 increases as the distance from the stator 10 increases in the radial direction. However, similarly to the first embodiment, the width of the second hole 32 may be constant regardless of the radial position.

Figure 18:
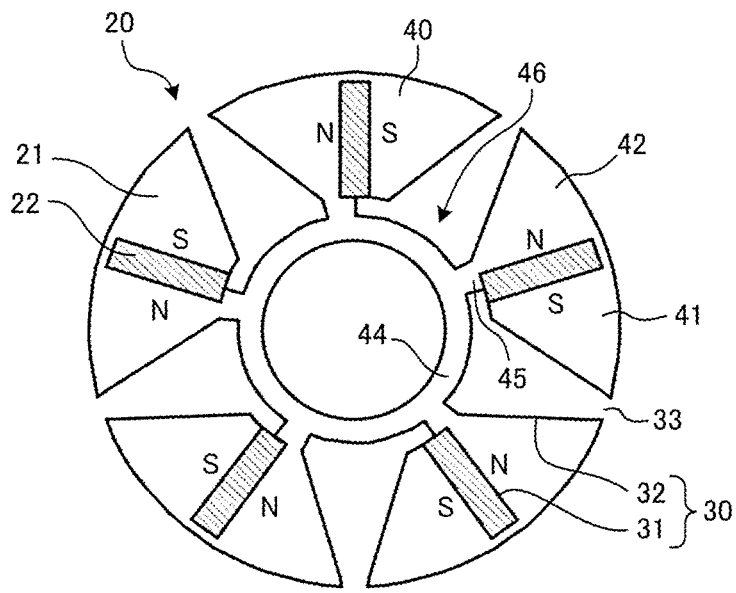
FIG. 18 is a sectional view for illustrating a configuration of a rotor of a rotating electric machine according to a modification example 3-1 of the third embodiment of the present invention, which is taken perpendicularly to the axial direction.

FIG. 18 is a sectional view for illustrating a configuration of a rotor 20 of a rotating electric machine 100 according to a modification example 3-1 of this embodiment, which is taken perpendicularly to the axial direction. A rotor core 21 in this modification example includes a coupling portion 46 (which may be hereinafter referred to as "second coupling portion 46") that couples the plurality of second core portions 42 to each other. The coupling portion 46 includes an annular portion 44 and a plurality of radial portions 45. The annular portion 44 is formed in an annular shape. The plurality of radial portions 45 radially extend from the annular portion 44 toward the plurality of second core portions 42, and connect the annular portion 44 and the plurality of second core portions 42 to each other. With this, the plurality of second core portions 42 are magnetically connected to each other through the coupling portion 46.

Meanwhile, each of the plurality of first core portions 41 is not directly connected to the radial portion 45 of the coupling portion 46. Each of the plurality of first core portions 41 is connected to the coupling portion 46 only through the second core portion 42 adjacent to the corresponding first core portion 41 across the permanent magnet 22. Also in this modification example, the same effects as those of the configuration illustrated in FIG. 17 can be obtained.

Further, the rotor 20 in this embodiment may have a configuration in which the rotor core 21 illustrated in FIG. 17 and the rotor core 21 illustrated in FIG. 18 are laminated in the axial direction. For example, the rotor cores 21 illustrated in FIG. 17 and the rotor cores 21 illustrated in FIG. 18 are alternately laminated in the axial direction. With this, the mechanical strength of the rotor 20 can be further improved.

Figure 19:
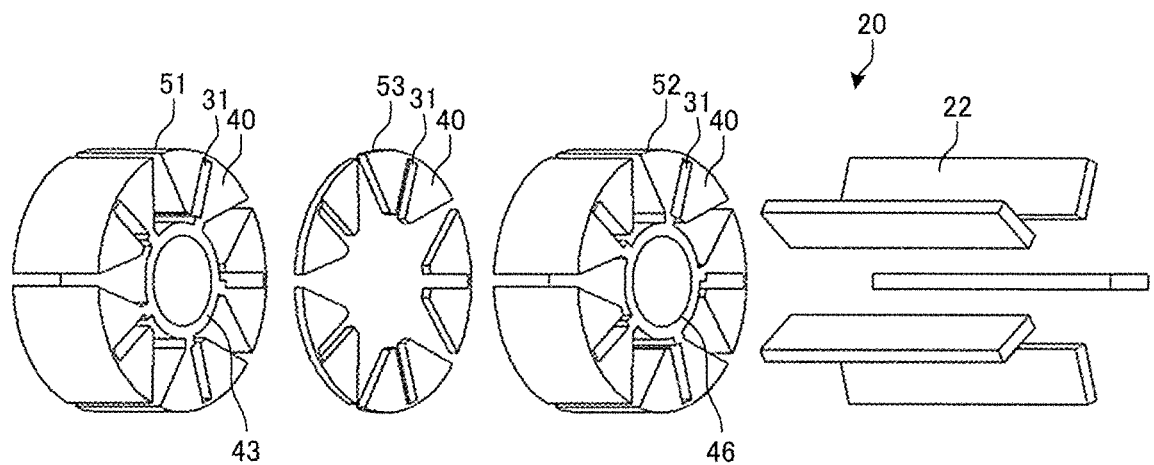
FIG. 19 is an exploded perspective view for illustrating a configuration of a rotor of a rotating electric machine according to a modification example 3-2 of the third embodiment of the present invention.

FIG. 19 is an exploded perspective view for illustrating a configuration of a rotor 20 of a rotating electric machine 100 according to a modification example 3-2 of this embodiment. As illustrated in FIG. 19, the rotor 20 in this modification example has a configuration in which a first rotor core 51, a second rotor core 52, and a third rotor core 53 are laminated in the axial direction. The first rotor core 51, the second rotor core 52, and the third rotor core 53 are laminated such that circumferential positions of the first holes 31 of the respective rotor cores match each other. The permanent magnets 22 are inserted into the first holes 31 of the respective first rotor core 51, second rotor core 52, and third rotor core 53 so as to pass through the first rotor core 51, the second rotor core 52, and the third rotor core 53.

The first rotor core 51 has a configuration similar to that of the rotor core 21 illustrated in FIG. 17 as viewed from the deep side of FIG. 19 along the axial direction. The second rotor core 52 has a configuration similar to that of the rotor core 21 illustrated in FIG. 18 as viewed from the deep side of FIG. 19 along the axial direction.

Figure 20:
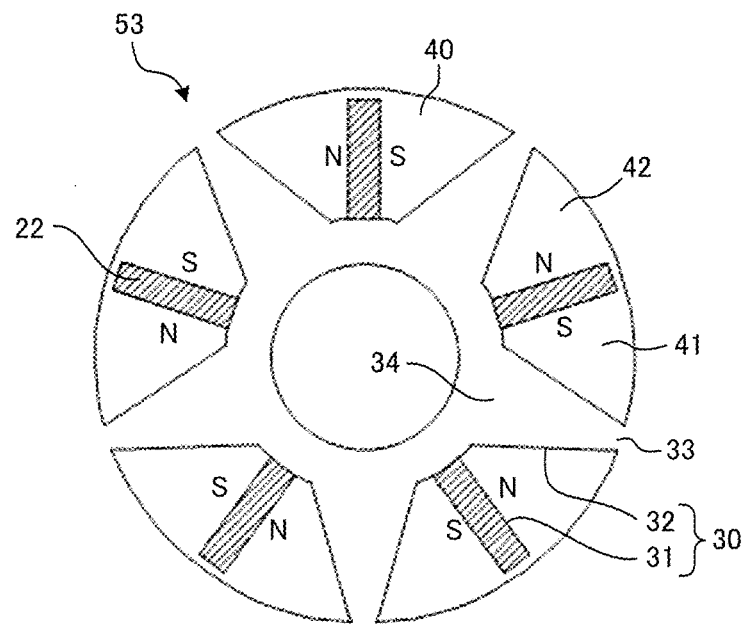
FIG. 20 is a sectional view for illustrating a configuration of a third rotor core of the rotating electric machine according to the modification example 3-2 of the third embodiment of the present invention, which is taken perpendicularly to the axial direction.

FIG. 20 is a sectional view for illustrating a configuration of the third rotor core 53 of the rotating electric machine 100 according to this modification example, which is taken perpendicularly to the axial direction. As illustrated in FIG. 20, similarly to the first rotor core 51 and the second rotor core 52, the third rotor core 53 includes a plurality of core portions 40. Each of the plurality of core portions 40 includes a first core portion 41 located on the S pole side of the permanent magnet 22, and a second core portion 42 located on the N pole side of the permanent magnet 22.

The coupling portion 43 is not provided to the third rotor core 53 unlike the first rotor core 51 and the second rotor core 52. Thus, the plurality of core portions 40 of the third rotor core 53 are separated from each other.

Referring back to FIG. 19, the rotor 20 has a configuration in which the first rotor core 51, the third rotor core 53, and the second rotor core 52 are laminated in this order in the axial direction. When a plurality of first rotor cores 51 or a plurality of second rotor cores 52 are laminated, for example, the first rotor core 51, the third rotor core 53, the second rotor core 52, the third rotor core 53, the first rotor core 51, the third rotor core 53, the second rotor core 52, . . . are laminated in this order. The third rotor core 53 is sandwiched between the first rotor core 51 and the second rotor core 52. A thickness of the first rotor core 51 in the axial direction is larger than a thickness of the third rotor core 53 in the axial direction. Similarly, a thickness of the second rotor core 52 in the axial direction is larger than the thickness of the third rotor core 53 in the axial direction. With this, the coupling portion 43 provided to the first rotor core 51 and the coupling portion 43 provided to the second rotor core 52 each have a constant thickness.

According to this modification example, the leakage magnetic flux of the rotor 20 in the axial direction can be suppressed, and the mechanical strength of the rotor 20 can be improved.

Figure 21:
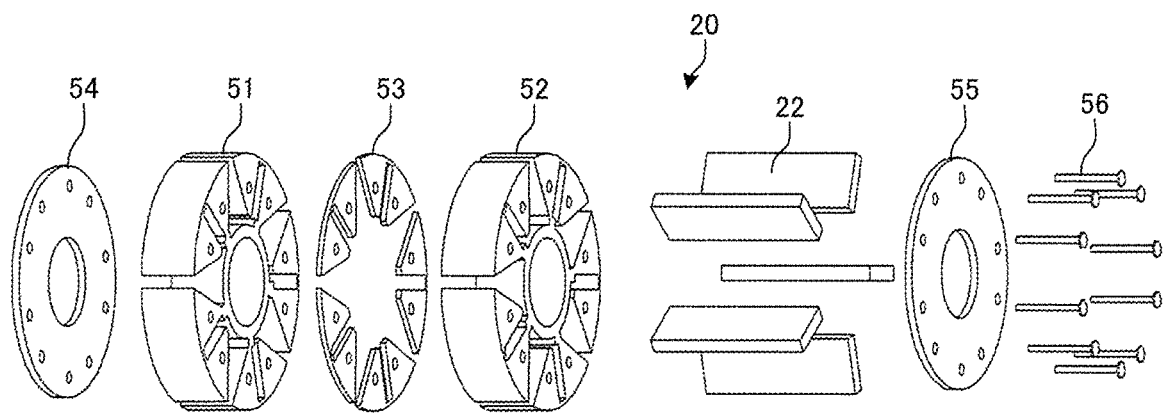
FIG. 21 is an exploded perspective view for illustrating a configuration of a rotor of a rotating electric machine according to a modification example 3-3 of the third embodiment of the present invention.

FIG. 21 is an exploded perspective view for illustrating a configuration of a rotor 20 of a rotating electric machine 100 according to a modification example 3-3 of this embodiment. As illustrated in FIG. 21, the rotor 20 in this modification example further includes a pair of end plates 54 and 55. The end plate 54 and the end plate 55 are arranged on both axial ends of a rotor core in which the first rotor core 51, the second rotor core 52, and the third rotor core 53 are laminated. The end plate 54 and the end plate 55 are fastened in the axial direction together with the first rotor core 51, the second rotor core 52, and the third rotor core 53 using fastening members such as a plurality of bolts 56. According to this modification example, the mechanical strength of the rotor 20 can be further improved, and the rotor 20 can be integrated.

As described above, in the rotating electric machine 100 according to this embodiment, the rotor core 21 includes the plurality of core portions 40 each sandwiched by the two second holes 32 adjacent to each other in the circumferential direction. Each of the plurality of core portions 40 includes the first core portion 41 located on one magnetic-pole surface side of the permanent magnet 22, and the second core portion 42 located on the other magnetic-pole surface side of the permanent magnet 22. The rotor core 21 further includes the coupling portion 43 that couples the first core portions 41 of the plurality of core portions 40 to each other. According to this configuration, the plurality of first core portions 41 having the same pole are coupled to each other through the coupling portion 43, thereby being capable of suppressing occurrence of the circumferential leakage magnetic flux Φ2. Thus, the torque in the rotating electric machine 100 can be improved. Further, the plurality of core portions 40 are integrated through the coupling portion 43, thereby being capable of improving the mechanical strength of the rotor 20.

Further, in the rotating electric machine 100 according to this embodiment, the rotor core 21 includes the first rotor core 51 and the second rotor core 52 laminated on each other in the axial direction. Each of the first rotor core 51 and the second rotor core 52 includes the plurality of core portions 40 each sandwiched by the two second holes 32 adjacent to each other in the circumferential direction. Each of the plurality of core portions 40 includes the first core portion 41 located on the one magnetic-pole surface side of the permanent magnet 22, and the second core portion 42 located on the other magnetic-pole surface side of the permanent magnet 22. The first rotor core 51 further includes the first coupling portion 43 that couples the first core portions 41 of the first rotor core 51 to each other. The second rotor core 52 further includes the second coupling portion 46 that couples the second core portions 42 of the second rotor core 52 to each other. According to this configuration, in the first rotor core 51, the plurality of first core portions 41 having the same pole are coupled to each other through the coupling portion 43, thereby being capable of suppressing occurrence of the circumferential leakage magnetic flux Φ2. Further, in the second rotor core 52, the plurality of second core portions 42 having the same pole are coupled to each other through the coupling portion 46, thereby being capable of suppressing occurrence of the circumferential leakage magnetic flux Φ2. Thus, the torque in the rotating electric machine 100 can be improved. Further, the first rotor core 51 and the second rotor core 52 are laminated in the axial direction, thereby being capable of further improving the mechanical strength of the rotor 20.

Further, in the rotating electric machine 100 according to this embodiment, the rotor core 21 includes the first rotor core 51, the second rotor core 52, and the third rotor core 53 laminated on each other in the axial direction. Each of the first rotor core 51, the second rotor core 52, and the third rotor core 53 includes the plurality of core portions 40 each sandwiched by the two second holes 32 adjacent to each other in the circumferential direction. Each of the plurality of core portions 40 includes the first core portion 41 located on the one magnetic-pole surface side of the permanent magnet 22, and the second core portion 42 located on the other magnetic-pole surface side of the permanent magnet 22. The first rotor core 51 further includes the first coupling portion 43 that couples the first core portions 41 of the first rotor core 51 to each other. The second rotor core 52 further includes the second coupling portion 46 that couples the second core portions 42 of the second rotor core 52 to each other. The plurality of core portions 40 of the third rotor core 53 are not coupled to each other in the third rotor core 53. In the axial direction, the third rotor core 53 is arranged between the first rotor core 51 and the second rotor core 52. According to this configuration, in the first rotor core 51, the plurality of first core portions 41 having the same pole are coupled to each other through the coupling portion 43, thereby being capable of suppressing occurrence of the circumferential leakage magnetic flux Φ2. Further, in the second rotor core 52, the plurality of second core portions 42 having the same pole are coupled to each other through the coupling portion 46, thereby being capable of suppressing occurrence of the circumferential leakage magnetic flux Φ2. Further, the third rotor core 53 in which the plurality of core portions 40 are not coupled to each other is arranged between the first rotor core 51 and the second rotor core 53, thereby being capable of suppressing occurrence of the leakage magnetic flux in the axial direction. Thus, the torque in the rotating electric machine 100 can be improved.

Fourth Embodiment

Figure 22:
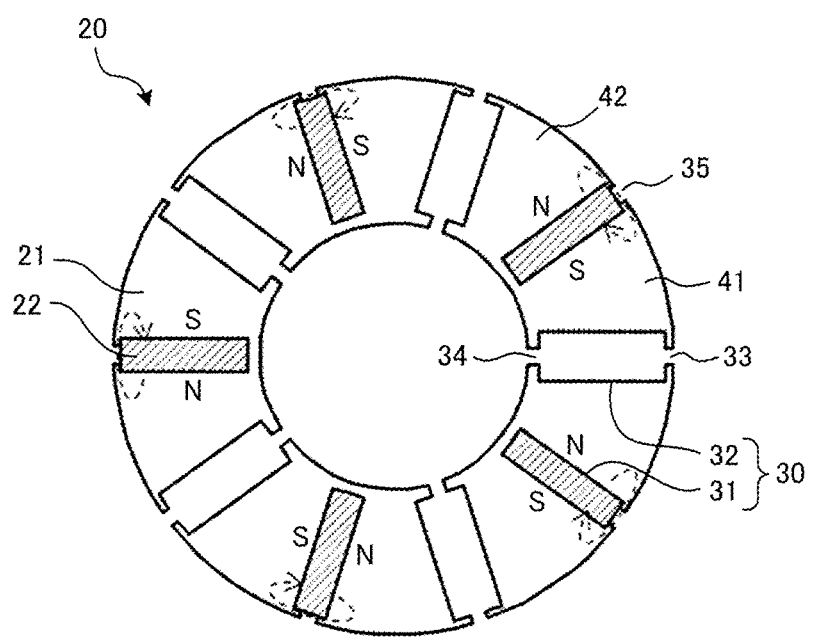
FIG. 22 is a sectional view for illustrating a configuration of a rotor of a rotating electric machine according to a fourth embodiment of the present invention, which is taken perpendicularly to the axial direction.

A rotating electric machine according to a fourth embodiment of the present invention is described. FIG. 22 is a sectional view for illustrating a configuration of a rotor 20 of a rotating electric machine 100 according to this embodiment, which is taken perpendicularly to the axial direction. Components having the same functions and effects as any of the first to third embodiments are denoted by the same reference symbols, and description thereof is omitted.

As illustrated in FIG. 22, in this embodiment, the first holes 31 into which the permanent magnets 22 are inserted each include a third opening portion 35 that opens toward the stator 10 side in the radial direction, that is, the outer side in the radial direction. The permanent magnet 22 is not inserted into the third opening portion 35, and hence the third opening portion 35 serves as a magnetic gap in the circumferential direction at an outer peripheral portion of the rotor core 21. The third opening portion 35 may be a space. Alternatively, a non-magnetic member may be filled in the third opening portion 35. In the configuration illustrated in FIG. 22, similarly to the configuration illustrated in FIG. 8, the width of the first hole 31 in the tangential direction along the circumferential direction is smaller than the width of the second hole 32 in the tangential direction along the circumferential direction.

In the configurations of the above-mentioned first to third embodiments, the radially outer sides of the first holes 31 are closed. The first core portion 41 located on the S pole side of the permanent magnet 22 is magnetized to the S pole, and the second core portion 42 located on the N pole side of the permanent magnet 22 is magnetized to the N pole. Thus, the closed magnetic circuit in which the magnetic flux flowing out from the permanent magnet 22 passes through the radially outer side of the first hole 31 and returns to the permanent magnet 22 is formed between the second core portion 42 and the first core portion 41. The magnetic flux passing through the closed magnetic circuit becomes a leakage magnetic flux that is not interlinked with the stator 10. When the leakage magnetic flux can be suppressed, the effective magnetic flux Φ1 interlinked with the stator 10 can be increased, thereby being capable of improving the torque output in the rotating electric machine 100.

In this embodiment, the third opening portion 35 is formed on the radially outer side of the first hole 31, and hence the magnetic resistance of the above-mentioned closed magnetic circuit is increased. With this, the leakage magnetic fluxes as indicated by the broken line arrows in FIG. 22 can be suppressed, thereby being capable of improving the torque output in the rotating electric machine 100. When the width of the first hole 31 is smaller than the width of the second hole 32, the above-mentioned leakage magnetic fluxes are liable to occur. However, in this embodiment, the third opening portion 35 is formed. Thus, even when the width of the first hole 31 is smaller than the width of the second hole 32, the above-mentioned leakage magnetic fluxes can be effectively suppressed.

Figure 23:
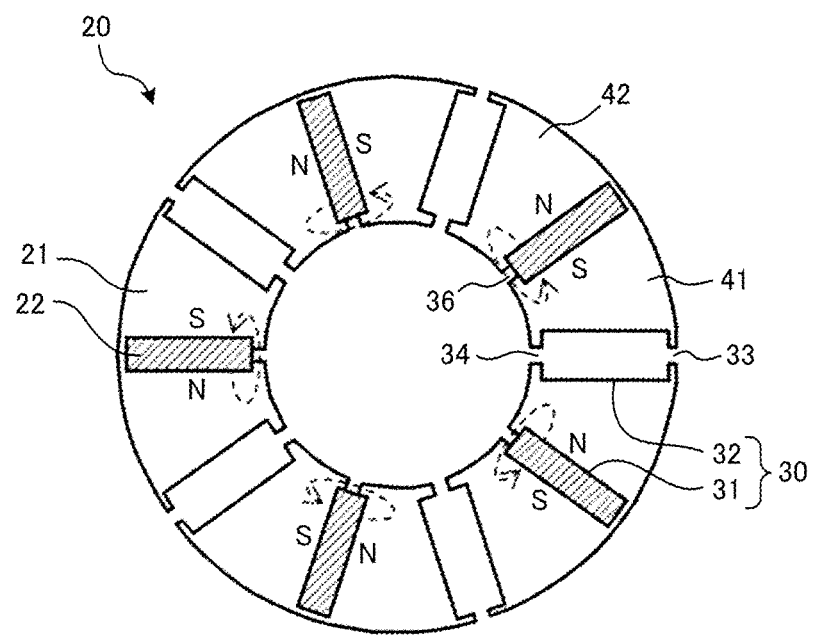
FIG. 23 is a sectional view for illustrating a configuration of a rotor of a rotating electric machine according to a modification example 4-1 of the fourth embodiment of the present invention, which is taken perpendicularly to the axial direction.

FIG. 23 is a sectional view for illustrating a configuration of a rotor 20 of a rotating electric machine 100 according to a modification example 4-1 of this embodiment, which is taken perpendicularly to the axial direction. As illustrated in FIG. 23, the first hole 31 in this modification example includes a fourth opening portion 36 that opens toward the side opposite to the stator 10 in the radial direction, that is, the radially inner side. The closed magnetic circuit in which the magnetic flux flowing out from the permanent magnet 22 returns to the permanent magnet 22 is formed also on the radially inner side of the first hole 31. In this modification example, the magnetic resistance of the closed magnetic circuit formed on the radially inner side of the first hole 31 is increased. With this, the leakage magnetic fluxes as indicated by the broken line arrows in FIG. 23 can be suppressed, thereby being capable of improving the torque output in the rotating electric machine 100.

Also in the configuration of this modification example, the width of the first hole 31 is smaller than the width of the second hole 32. However, in the configuration of this modification example, the fourth opening portion 36 is formed. Thus, even when the width of the first hole 31 is smaller than the width of the second hole 32, the above-mentioned leakage magnetic fluxes can be effectively suppressed.

Figure 24:
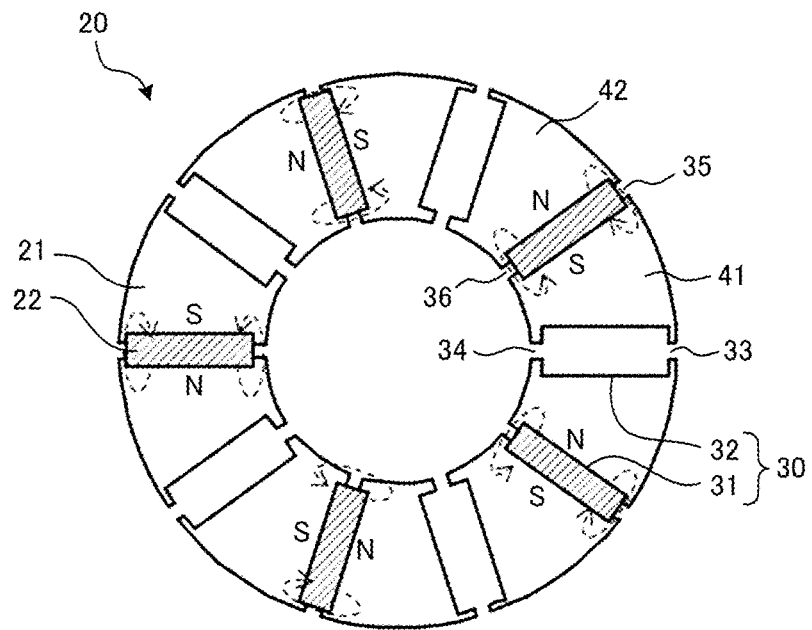
FIG. 24 is a sectional view for illustrating a configuration of a rotor of a rotating electric machine according to a modification example 4-2 of the fourth embodiment of the present invention, which is taken perpendicularly to the axial direction.

FIG. 24 is a sectional view for illustrating a configuration of a rotor 20 of a rotating electric machine 100 according to a modification example 4-2 of this embodiment, which is taken perpendicularly to the axial direction. As illustrated in FIG. 24, the first hole 31 in this modification example includes both the third opening portion 35 and the fourth opening portion 36. According to this modification example, both the above-mentioned two effects can be obtained, thereby being capable of further improving the torque output in the rotating electric machine 100.

Also in the configuration of this modification example, the width of the first hole 31 is smaller than the width of the second hole 32. However, in the configuration of this modification example, the third opening portion 35 and the fourth opening portion 36 are formed. Thus, even when the width of the first hole 31 is smaller than the width of the second hole 32, the above-mentioned leakage magnetic fluxes can be effectively suppressed.

As described above, in the rotating electric machine 100 according to this embodiment, the first hole 31 includes the third opening portion 35 that opens to the stator 10 side in the radial direction, or the fourth opening portion 36 that opens to the side opposite to the stator 10 in the radial direction. According to this configuration, the leakage magnetic fluxes can be suppressed, thereby being capable of improving the torque output in the rotating electric machine 100.

Fifth Embodiment

Figure 25:
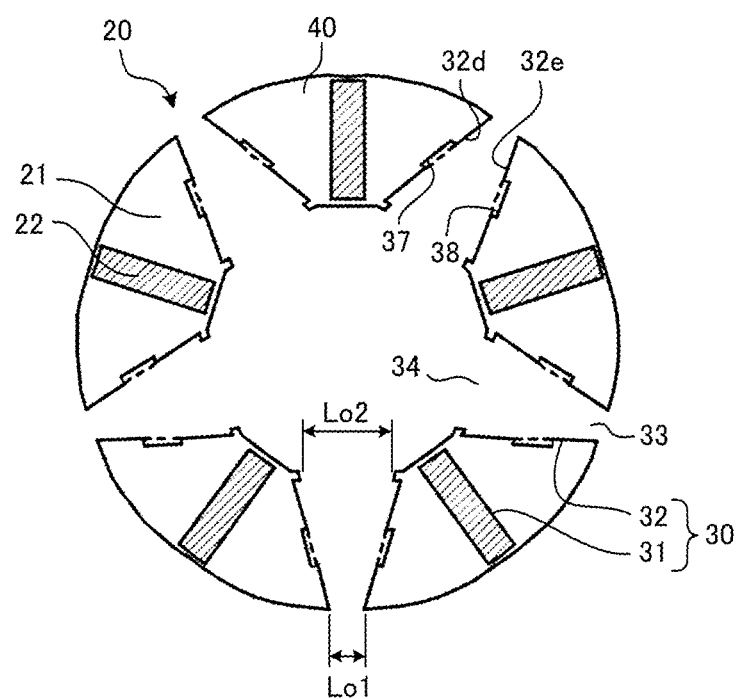
FIG. 25 is a sectional view for illustrating a configuration of a rotor of a rotating electric machine according to a fifth embodiment of the present invention, which is taken perpendicularly to the axial direction.

A rotating electric machine according to a fifth embodiment of the present invention is described. FIG. 25 is a sectional view for illustrating a configuration of a rotor 20 of a rotating electric machine 100 according to this embodiment, which is taken perpendicularly to the axial direction. Components having the same functions and effects as any of the first to third embodiments are denoted by the same reference symbols, and description thereof is omitted.

As illustrated in FIG. 25, the rotor core 21 is separated into the plurality of core portions 40 by the second holes 32. The second holes 32 are each sandwiched by the edge portion 32d and the edge portion 32e in the circumferential direction. One edge portion 32d is formed in the core portion 40 adjacent to the second hole 32 in a counterclockwise direction in FIG. 25. A recessed portion 37 taken into a recessed shape is formed at a part of the edge portion 32d. The edge portion 32d excluding the recessed portion 37 is formed in a linear shape. The other edge portion 32e is formed in the core portion 40 adjacent to the second hole 32 in a clockwise direction in FIG. 25. A recessed portion 38 cut into a recessed shape is formed at a part of the edge portion 32e. The edge portion 32e excluding the recessed portion 38 is formed in a linear shape.

A centrifugal force toward the radially outer side is generated in the rotor 20 during rotation. Thus, the plurality of core portions 40 separated from each other may fall out to the outer peripheral side during the rotation. When the core portions 40 fall out to the outer peripheral side, the core portions 40 may come into contact with the stator 10, thus leading to stop of the rotating electric machine 100.

In this embodiment, a holding member (not shown) made of a non-magnetic material such as resin or non-magnetic metal is inserted into the second holes 32. The holding member includes a protruding portion fitted into the recessed portion 37, and a different protruding portion fitted into the recessed portion 38. The core portions 40 are held by the holding member, thereby preventing the core portions 40 from falling out to the outer peripheral side. Further, with the holding member, the positioning accuracy of the rotor core 21 in the circumferential direction is improved. Moreover, the positioning accuracy of the rotor core 21 is improved with the holding member, thereby suppressing an increase in torque ripple due to an influence of variation in rotor.

In the configuration illustrated in FIG. 25, the opening width Lo1 of the first opening portion 33 in the tangential direction along the circumferential direction is smaller than an opening width Lo2 of the second opening portion 34 in the tangential direction along the circumferential direction (Lo1<Lo2). However, the opening width Lo1 of the first opening portion 33 may be equal to the opening width Lo2 of the second opening portion 34 (Lo1=Lo2). Further, the width of the second hole 32 may be changed in a stepwise manner as illustrated in FIG. 11 and FIG. 13.

The present invention is not limited to the above-mentioned embodiments, and various modifications may be made thereto. For example, in the above-mentioned embodiments, the rotor 20 having ten poles is given as an example, but the present invention is not limited thereto. Even when the number of magnetic poles "p" of the rotor 20 (provided that "p" is an even number of two or more) is other than 10, the same effects as those of the above-mentioned embodiments are obtained. Further, in the above-mentioned embodiments, the stator 10 including the twelve teeth 13 and the twelve windings 14 is given as an example, but the present invention is not limited thereto. The number of teeth 13 and the number of windings 14 may be set to an appropriate number in accordance with the number of magnetic poles of the rotor 20.

Further, in the above-mentioned embodiments, the rotating electric machine 100 in which the rotor 20 is arranged on the inner peripheral side of the stator 10 is given as an example. However, the present invention is also applicable to a rotating electric machine in which the rotor 20 is arranged on the outer peripheral side of the stator 10.

The above-mentioned first to fifth embodiments and the modification examples may be carried out in combination with each other.

REFERENCE SIGNS LIST 10 stator, 11 stator core, 12 core back, 13 tooth, 14 winding, 15 gap, 20 rotor, 21 rotor core, 21a outer peripheral surface, 22 permanent magnet, 30 hole, 31 first hole, 32 second hole, 32a first portion, 32b second portion, 32c third portion, 32d, 32e edge portion, 33 first opening portion, 34 second opening portion, 35 third opening portion, 36 fourth opening portion, 37, 38 recessed portion, 40 core portion, 41 first core portion, 42 second core portion, 43, 46 coupling portion, 44 annular portion, 45 radial portion, 51 first rotor core, 52 second rotor core, 53 third rotor core, 54, 55 end plate, 56 bolt, 100, 200 rotating electric machine, 201, 202 connecting portion, Φ1 effective magnetic flux, Φ2 circumferential leakage magnetic flux.

The invention claimed is:

1. A rotating electric machine, comprising:
a stator; and
a rotor provided rotatably with respect to the stator,
wherein the rotor includes:
a rotor core having a plurality of holes formed so as to be arranged in a circumferential direction of the rotor; and
at least one permanent magnet, wherein the number of magnetic poles of the rotor is "p" which is an even number of two or more,
wherein the plurality of holes include a first hole into which the permanent magnet is inserted, and a second hole into which the permanent magnet is not inserted, the first hole comprising p/2 first holes, the second hole comprising p/2 second holes,
wherein the first hole and the second hole are formed so as to be alternately arranged in the circumferential direction,
wherein the permanent magnet is magnetized such that magnetic-pole surfaces facing each other in the circumferential direction across the second hole have different poles,
wherein the second hole, when viewed from an axial direction, has an open cross section that includes a first opening at an outer peripheral portion of the rotor to form a gap in the circumferential direction at the outer peripheral portion of the rotor core, and a second opening portion at an inner peripheral portion of the rotor core to form a gap in the circumferential direction at the inner peripheral portion of the rotor core, and
wherein at a portion of the second hole between the first opening portion and the second opening portion, a width of the second hole in a tangential direction along the circumferential direction is increased from the stator side toward the side opposite to the stator in the radial direction.

2. The rotating electric machine according to claim 1, wherein the second hole includes a first portion, and a second portion located on the stator side in the radial direction with respect to the first portion, and
wherein, when a width of the first portion in a tangential direction along the circumferential direction is L1, and a width of the second portion in the tangential direction is L2, a relationship of L1>L2 is satisfied.

3. The rotating electric machine according to claim 2, wherein the second hole is formed so as to have a width in the tangential direction that monotonically increases as a distance from the stator increases in the radial direction.

4. The rotating electric machine according to claim 1, wherein, when an opening width of the first opening portion is Lo1, and a maximum value of an interval between the stator and the rotor in the radial direction is Gmmax, a relationship of Lo1>Gmmax is satisfied.

5. The rotating electric machine according to claim 1, wherein the rotor core includes a plurality of core portions each sandwiched by two second holes adjacent to each other in the circumferential direction,
wherein each of the plurality of core portions includes a first core portion located on one magnetic-pole surface side of the permanent magnet, and a second core portion located on the other magnetic-pole surface side of the permanent magnet, and
wherein the rotor core further includes a coupling portion that couples the first core portions of the plurality of core portions to each other.

6. The rotating electric machine according to claim 1, wherein the first hole includes a third opening portion that opens to the stator side in the radial direction, or a fourth opening portion that opens to a side opposite to the stator in the radial direction.

7. The rotating electric machine according to claim 1, wherein the width of the second hole in the tangential direction along the circumferential direction is increased in a stepwise manner from the stator side toward the side opposite to the stator in the radial direction.

8. The rotating electric machine according to claim 1, wherein the second hole is filled with a non-magnetic material.

9. The rotating electric machine according to claim 8, wherein the non-magnetic material is a resin.

10. A rotating electric machine, comprising:
a stator; and
a rotor provided rotatably with respect to the stator, wherein the rotor includes:
a rotor core having a plurality of holes formed so as to be arranged in a circumferential direction of the rotor; and
at least one permanent magnet,
wherein the number of magnetic poles of the rotor is "p" which is an even number of two or more,
wherein the plurality of holes include a first hole into which the permanent magnet is inserted, and a second hole into which the permanent magnet is not inserted, the first hole comprising p/2 first holes, the second hole comprising p/2 second holes,
wherein the first hole and the second hole are formed so as to be alternately arranged in the circumferential direction,
wherein the permanent magnet is magnetized such that magnetic-pole surfaces facing each other in the circumferential direction across the second hole have different poles,
wherein the second hole, when viewed from an axial direction, has an open cross section that includes two opening portions respectively located at an inner peripheral portion of the rotor core and an outer peripheral portion of the rotor core to form gaps in the circumferential direction in the inner peripheral portion and the outer peripheral portion of the rotor core, respectively,
wherein the rotor core includes a first rotor core and a second rotor core laminated on each other in an axial direction,
wherein each of the first rotor core and the second rotor core includes a plurality of core portions sandwiched by two second holes adjacent to each other in the circumferential direction,
wherein each of the plurality of core portions includes a first core portion located on one magnetic-pole surface side of the permanent magnet, and a second core portion located on the other magnetic-pole surface side of the permanent magnet,
wherein the first rotor core further includes a first coupling portion that couples the first core portions of the first rotor core to each other, and
wherein the second rotor core further includes a second coupling portion that couples the second core portions of the second rotor core to each other.

11. The rotating electric machine according to claim 10, wherein the second hole includes a first portion, and a second portion located on the stator side in the radial direction with respect to the first portion, and
wherein, when a width of the first portion in a tangential direction along the circumferential direction is L1, and a width of the second portion in the tangential direction is L2, a relationship of L1>L2 is satisfied.

12. The rotating electric machine according to claim 11, wherein the second hole is formed so as to have a width in the tangential direction that monotonically increases as a distance from the stator increases in the radial direction.

13. The rotating electric machine according to claim 10, wherein, when an opening width of the first opening portion is Lo1, and a maximum value of an interval between the stator and the rotor in the radial direction is Gmmax, a relationship of Lo1>Gmmax is satisfied.

14. The rotating electric machine according to claim 10, wherein the first hole includes a third opening portion that opens to the stator side in the radial direction, or a fourth opening portion that opens to a side opposite to the stator in the radial direction.

15. A rotating electric machine, comprising:
a stator; and
a rotor provided rotatably with respect to the stator,
wherein the rotor includes:
a rotor core having a plurality of holes formed so as to be arranged in a circumferential direction of the rotor; and
at least one permanent magnet,
wherein the number of magnetic poles of the rotor is "p" which is an even number of two or more,
wherein the plurality of holes include a first hole into which the permanent magnet is inserted, and a second hole into which the permanent magnet is not inserted, the first hole comprising p/2 first holes, the second hole comprising p/2 second holes,
wherein the first hole and the second hole are formed so as to be alternately arranged in the circumferential direction,
wherein the permanent magnet is magnetized such that magnetic-pole surfaces facing each other in the circumferential direction across the second hole have different poles,
wherein the second hole, when viewed from an axial direction, has an open cross section that includes two opening portions respectively located at an inner peripheral portion of the rotor core and an outer peripheral portion of the rotor core to form gaps in the circumferential direction in the inner peripheral portion and the outer peripheral portion of the rotor core, respectively,
wherein the rotor core includes a first rotor core, a second rotor core, and a third rotor core laminated on each other in an axial direction,
wherein each of the first rotor core, the second rotor core, and the third rotor core includes a plurality of core portions sandwiched by two second holes adjacent to each other in the circumferential direction,
wherein each of the plurality of core portions includes a first core portion located on one magnetic-pole surface side of the permanent magnet, and a second core portion located on the other magnetic-pole surface side of the permanent magnet,
wherein the first rotor core further includes a first coupling portion that couples the first core portions of the first rotor core to each other,
wherein the second rotor core further includes a second coupling portion that couples the second core portions of the second rotor core to each other,
wherein the plurality of core portions of the third rotor core are not coupled to each other in the third rotor core, and
wherein the third rotor core is arranged between the first rotor core and the second rotor core in the axial direction.

16. The rotating electric machine according to claim 15, wherein the second hole includes a first portion, and a second portion located on the stator side in the radial direction with respect to the first portion, and
wherein, when a width of the first portion in a tangential direction along the circumferential direction is L1, and a width of the second portion in the tangential direction is L2, a relationship of L1>L2 is satisfied.

17. The rotating electric machine according to claim 16, wherein the second hole is formed so as to have a width in the tangential direction that monotonically increases as a distance from the stator increases in the radial direction.

18. The rotating electric machine according to claim 15, wherein, when an opening width of the first opening portion is Lo1, and a maximum value of an interval between the stator and the rotor in the radial direction is Gmmax, a relationship of Lo1>Gmmax is satisfied.

19. The rotating electric machine according to claim 15, wherein the first hole includes a third opening portion that opens to the stator side in the radial direction, or a fourth opening portion that opens to a side opposite to the stator in the radial direction.

* * * * *